US012672025B2

(12) United States Patent
Gopal Reddy et al.

(10) Patent No.: US 12,672,025 B2
(45) Date of Patent: Jun. 30, 2026

(54) LOCATION-BASED OPTIMIZATION OF QUALITY OF SERVICE NETWORK PERFORMANCE

(71) Applicant: T-Mobile USA, Inc., Bellevue, WA (US)

(72) Inventors: Sunil Kumar Gopal Reddy, Olathe, KS (US); Gerald D. Doaks, Overland Park, KS (US); Sharath Somashekar, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 472 days.

(21) Appl. No.: 18/324,942

(22) Filed: May 26, 2023

(65) Prior Publication Data

US 2024/0397374 A1 Nov. 28, 2024

(51) Int. Cl.
H04W 28/02 (2009.01)
H04W 28/24 (2009.01)

(52) U.S. Cl.
CPC ... H04W 28/0268 (2013.01); H04W 28/0226 (2013.01); H04W 28/24 (2013.01)

(58) Field of Classification Search
None
See application file for complete search history.

(56) References Cited

U.S. PATENT DOCUMENTS

| | | | |
|---|---|---|---|
| 8,483,702 B2 | 7/2013 | Noriega et al. | |
| 8,553,545 B2 | 10/2013 | Lee et al. | |
| 8,611,217 B2 | 12/2013 | Kotecha et al. | |

| | | | |
|---|---|---|---|
| 8,767,545 B2 | 7/2014 | Giaretta et al. | |
| 8,817,690 B2 | 8/2014 | Huang et al. | |
| 8,837,284 B2 | 9/2014 | Shi et al. | |
| 8,873,381 B2 | 10/2014 | Song et al. | |
| 9,374,807 B2 | 6/2016 | Rath et al. | |
| 9,456,387 B2 | 9/2016 | Viswanathan et al. | |

(Continued)

FOREIGN PATENT DOCUMENTS

| | | |
|---|---|---|
| CN | 101951555 B | 3/2013 |
| EP | 2053801 B1 | 6/2010 |

(Continued)

*Primary Examiner* — Schquita D Goodwin
*Assistant Examiner* — Ishrat Rashid
(74) *Attorney, Agent, or Firm* — Perkins Coie LLP

(57) ABSTRACT

An access and mobility management function (AMF) of a server system can receive performance parameters and location information from a user device. The performance parameters can describe the quality of a wireless connection of the user device on the telecommunications network. The server system can determine a geographical space associated with the user device based on the location information of the user device. The server system can determine a quality factor for the geographical space associated with the user device. The quality factor indicates whether a user device located within the geographical space should be allocated with guaranteed bit rate (GBR) resources or non-guaranteed bit rate (non-GBR) resources. The AMF can transmit a message including the quality factor to a core network function of the server system. The core network function can optimize the allocation of GBR and non-GBR resources for the geographical space based on the quality factor.

17 Claims, 6 Drawing Sheets

(56)                    References Cited

U.S. PATENT DOCUMENTS

| | | | |
|---|---|---|---|
| 9,554,389 B2 | 1/2017 | Anchan et al. | |
| 9,942,902 B2 | 4/2018 | Teshuva et al. | |
| 10,028,289 B2 | 7/2018 | Zhou et al. | |
| 10,070,477 B1 | 9/2018 | Marupaduga et al. | |
| 10,117,259 B2 | 10/2018 | Wang | |
| 10,142,889 B2 | 11/2018 | Dao | |
| 10,298,623 B2 | 5/2019 | Bouthemy | |
| 2013/0155966 A1* | 6/2013 | Bekiares | H04W 72/54 |
| | | | 370/329 |
| 2014/0295849 A1 | 10/2014 | Sirotkin | |
| 2015/0195374 A1 | 7/2015 | Wang et al. | |
| 2015/0264707 A1 | 9/2015 | Golderer et al. | |
| 2016/0142933 A1 | 5/2016 | Rastogi et al. | |
| 2018/0279336 A1 | 9/2018 | Yang et al. | |
| 2018/0302760 A1 | 10/2018 | Liu et al. | |
| 2022/0039046 A1* | 2/2022 | Ianev | H04W 60/00 |
| 2024/0022919 A1* | 1/2024 | Valenza | H04W 16/225 |

FOREIGN PATENT DOCUMENTS

| | | | |
|---|---|---|---|
| EP | 2452519 A1 | 5/2012 | |
| KR | 100358157 B1 | 10/2002 | |
| WO | 2014026326 A1 | 2/2014 | |
| WO | 2014128239 A1 | 8/2014 | |
| WO | 2014209494 A1 | 12/2014 | |
| WO | 2015062039 A1 | 5/2015 | |
| WO | 2015070646 A1 | 5/2015 | |
| WO | 2015104280 A2 | 7/2015 | |
| WO | 2017034511 A1 | 3/2017 | |
| WO | 2018072259 A1 | 4/2018 | |
| WO | 2018163557 A1 | 9/2018 | |

* cited by examiner

Figure 2:
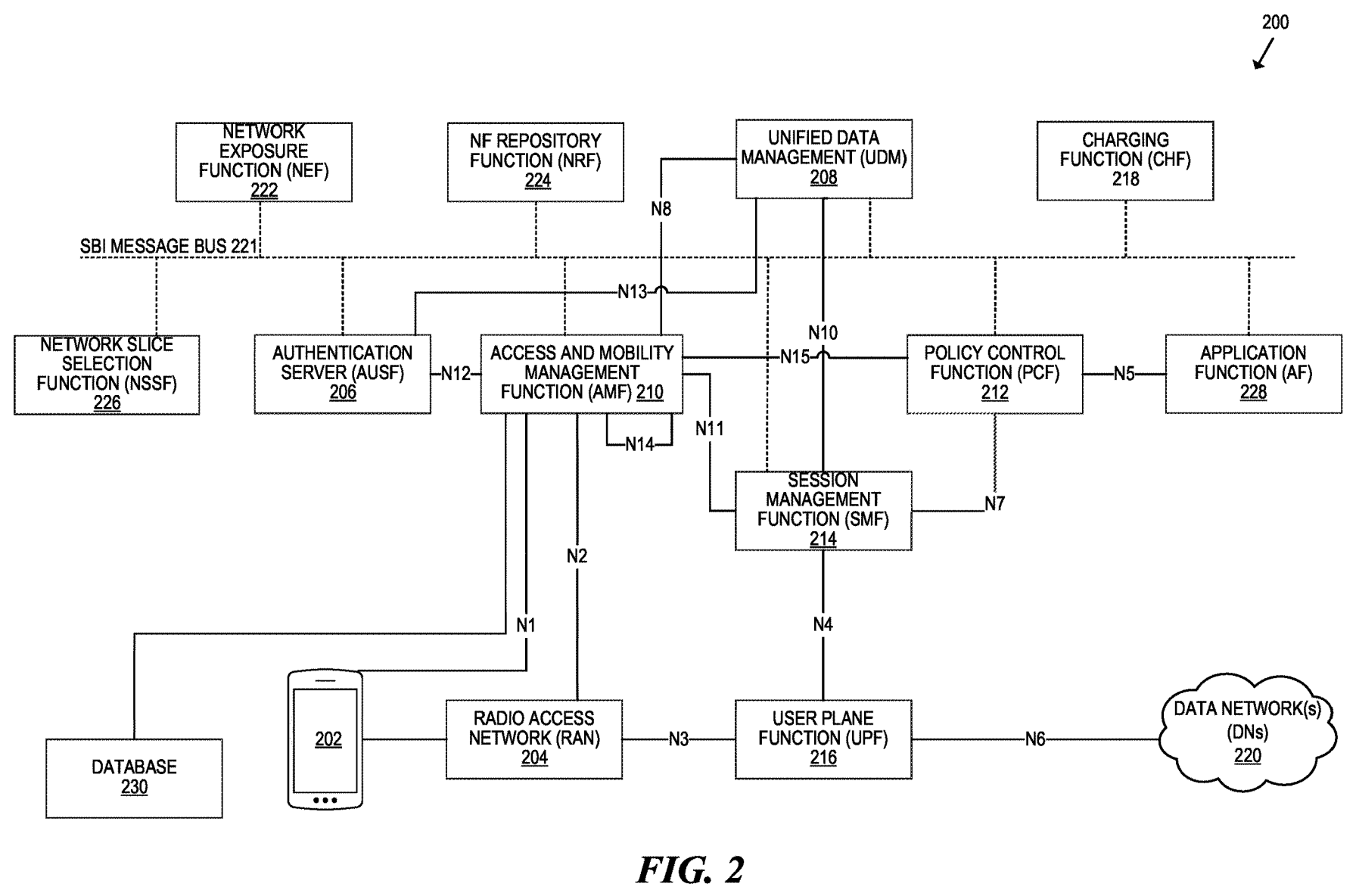

200

CHARGING FUNCTION (CHF) 218

APPLICATION FUNCTION (AF) 228

POLICY CONTROL FUNCTION (PCF) 212

UNIFIED DATA MANAGEMENT (UDM) 208

SESSION MANAGEMENT FUNCTION (SMF) 214

NF REPOSITORY FUNCTION (NRF) 224

ACCESS AND MOBILITY MANAGEMENT FUNCTION (AMF) 210

NETWORK EXPOSURE FUNCTION (NEF) 222

AUTHENTICATION SERVER (AUSF) 206

SBI MESSAGE BUS 221

NETWORK SLICE SELECTION FUNCTION (NSSF) 226

USER PLANE FUNCTION (UPF) 216

RADIO ACCESS NETWORK (RAN) 204

DATA NETWORK(s) (DNs) 220

DATABASE 230

| OPTO FUNCTION |
| --- |

LOGIC Step 1:

| CQI | SINR | DATASET 1 |
| --- | --- | --- |
| Range A | Range X | Excellent |
| Range B | Range Y | Moderate |
| Range C | Range Z | Poor |

LOGIC Step 2:

| Latitude | Longitude | GeoBin |
| --- | --- | --- |
| A | X | Geobin 1 |
| B | Y | Geobin 2 |
| C | Z | Geobin N |

LOGIC Step 3 (Time T):

| DATASET 1 | GeoBin | QOS-FACTOR |
| --- | --- | --- |
| Excellent | Geobin 1 | non-gbr (QF1) |
| Moderate | Geobin 2 | non-gbr (QF2) |
| Poor | Geobin N | gbr (QF3) |

Normalization FUNCTION

| Time Intervals (n) | GeoBin 1 | GeoBin 2 | GeoBin N |
| --- | --- | --- | --- |
| n+1 | Updated QF1 | Updated QF2 | Updated QF3 |
| n+2 | Updated QF1 | Updated QF2 | Updated QF3 |
| n+3 | Updated QF3 | Updated QF2 | Updated QF2 |

| Normalization Logic |
| --- |

| Updated QF | non-gbr | non-gbr | gbr |
| --- | --- | --- | --- |

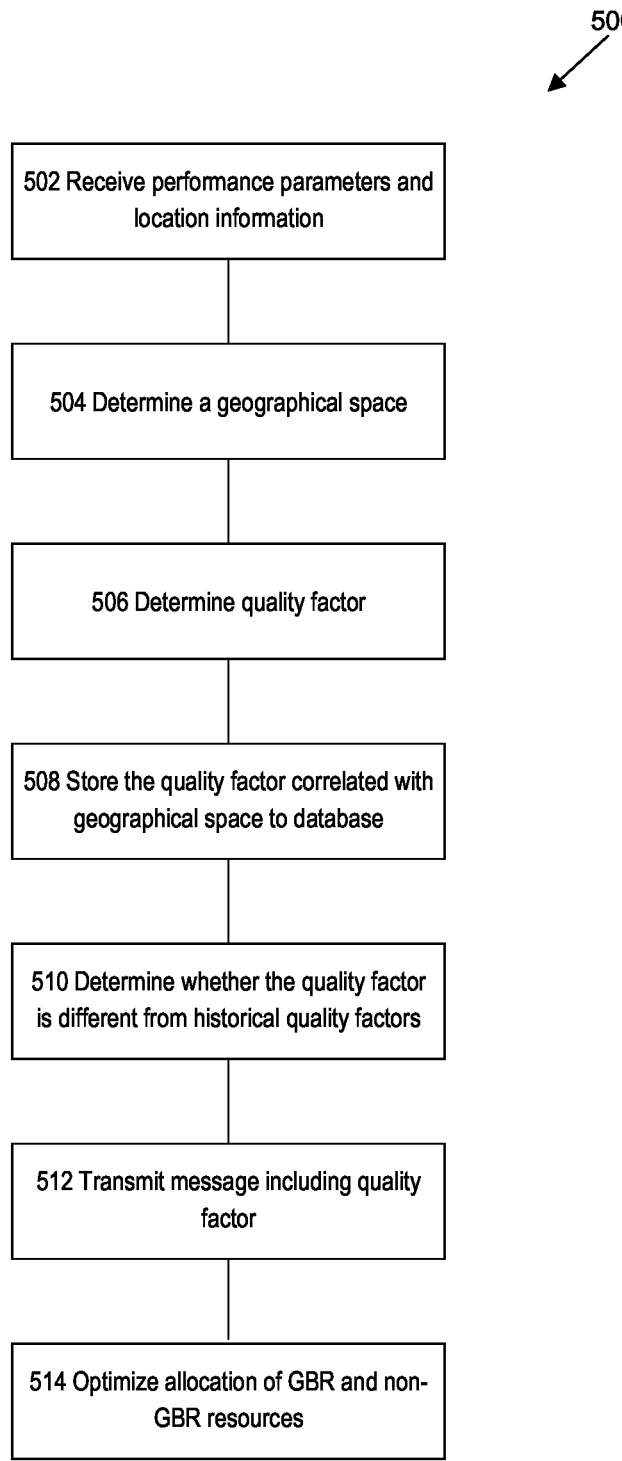

502 Receive performance parameters and location information

504 Determine a geographical space

506 Determine quality factor

508 Store the quality factor correlated with geographical space to database

510 Determine whether the quality factor is different from historical quality factors 512 Transmit message including quality factor 514 Optimize allocation of GBR and non-GBR resources

LOCATION-BASED OPTIMIZATION OF QUALITY OF SERVICE NETWORK PERFORMANCE

BACKGROUND

Quality of service (QOS) is a measure of the overall network performance of a service associated with telephone, computer, or cloud computing services. QoS plays a role in network planning and design. The measure can be defined by bit rate, packet loss, throughput, transmission delay, availability, and/or jitter. QoS can be applied to, for example, services for voice over Internet Protocol (VOIP), videotelephony, and media streaming. The QoS can be used to define priorities for certain customers or services during network congestion.

As an example, QoS can be used to optimize the deployment of resources. The resources can include, for example, bearers (e.g., channels for connecting user equipment to packet data networks (PDNs) dedicated to carrying IP flow traffic). The bearers can be dedicated as either a guaranteed bit rate (GBR) or a non-guaranteed bit rate (non-GBR). A GBR bearer is configured to require dedicated resources for a duration of a transmission and a high data rate. The GBR bearer is used for applications that require low latency and high data rates. A non-GBR bearer does not guarantee the availability of dedicated resources during transmission and can be used for applications that do not require such low latency and high data rates.

BRIEF DESCRIPTION OF THE DRAWINGS

Detailed descriptions of implementations of the present invention will be described and explained through the use of the accompanying drawings.

FIG. 2 is a block diagram that illustrates 5G core network functions (NFs) that can implement aspects of the present technology.

FIG. 4 is a diagram illustrating exemplary logic for transforming performance parameters into quality factors.

FIG. 5 is a flow diagram that illustrates processes for location-based optimization of QoS network performance.

Figure 1:
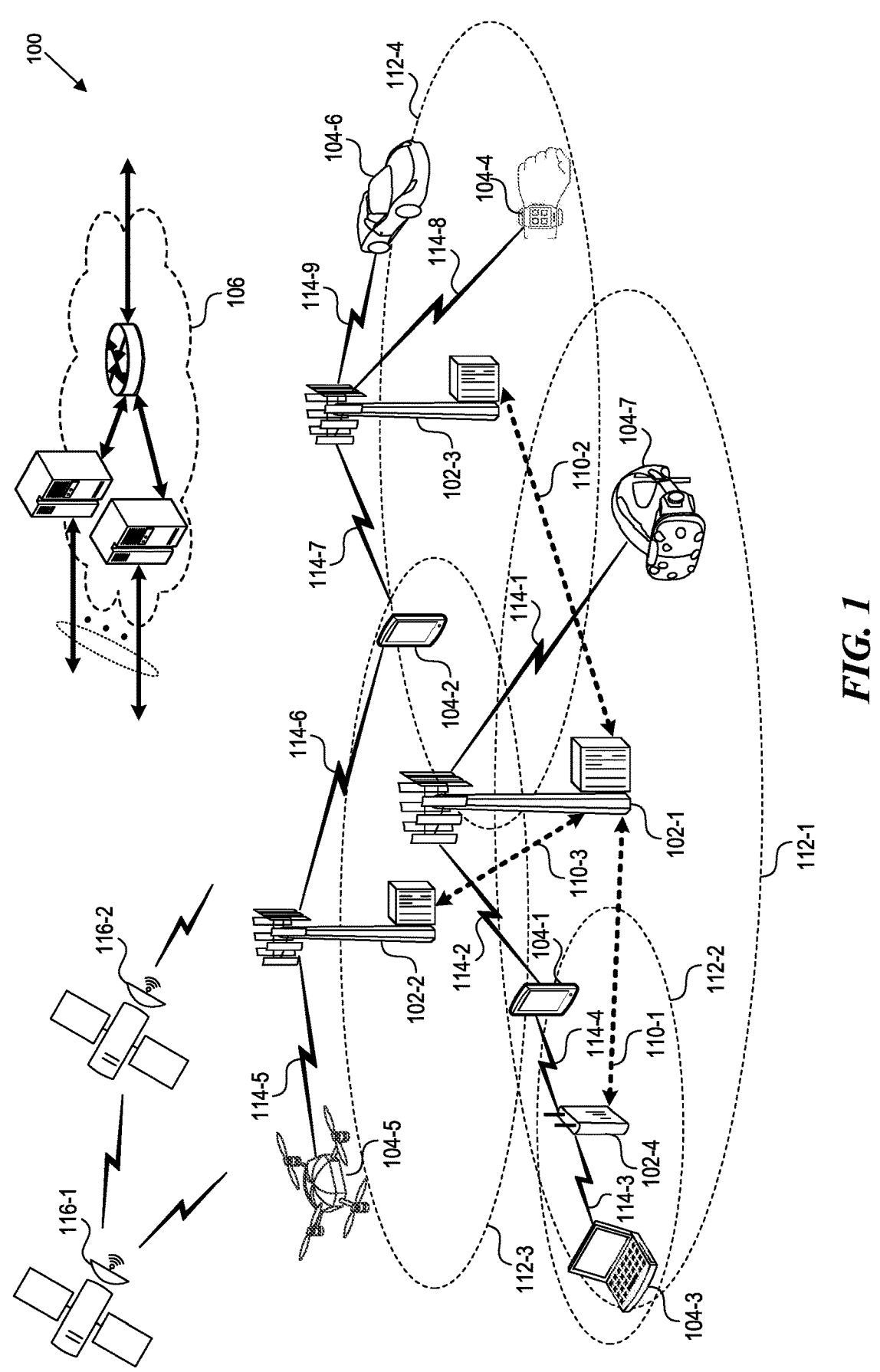
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology relates systems and methods for location-based optimization of QoS network performance based on wireless network performance information received from user devices. The performance information can include, for example, a real-time channel quality condition (CQI) and signal-to-noise ratio (SINR). The performance information can be used for determining a real-time quality factor (e.g., QoS factor) for a geographical space (e.g., a geobin) that describes the network performance that user devices in that geographical space are currently experiencing. The quality factor can indicate whether a user device located within the geographical space should be allocated with GBR resources or whether non-GBR resources would be sufficient for providing a required QoS. The quality factor is generated by an access and mobility management function (AMF) of the core network functions of a telecommunications network. The AMF communicates the quality factor to core network functions (e.g., a policy control function (PCF) of the core network functions). The core network function can be configured to allocate the GBR and non-GBR resources for user devices located within the geographical area based on the quality factor.

Several applications, such as video calling, require GBR resources to perform in accordance with the QoS requirements. The performance of the GBR resources is, however, highly sensitive to user density and radio network loading activities. Using the GBR resources efficiently is therefore highly important for the ability to provide the required QoS. The ability to track the network performance in geographical spaces can allow the core network functions to allocate the GBR resources with an increased efficiency. For example, whenever a video call is made by a terminating mobile device, the network service provider deploys a certain amount of GBR resources to perform the video call. The GBR resources are allocated regardless of a real-time need. For example, the user device may be located in a region that can provide the required QoS performance without deploying GBR resources (e.g., by instead deploying non-GBR resources).

In one example, an AMF of a server system can receive performance parameters and location information from a user device. The performance parameters can describe the quality of a wireless connection between the user device and the telecommunications network during a real-time time interval. The location information includes location information for the user device during the real-time time interval. The server system can determine a geographical space associated with the user device based on the location information of the user device. The server system can determine a quality factor for the geographical space associated with the user device. The quality factor indicates whether a user device located within the geographical space should be allocated with GBR resources or non-GBR resources. The server system can determine whether the quality factor for the real-time time interval is different from historical quality factors for the geographical space. The historical quality factors are stored in a database. In response to a determination that the quality factor for the real-time time interval is different from the historical quality factors, the AMF can transmit a message including the quality factor to a core network function of the server system. The core network function can optimize, by the core network function, the allocation of GBR and non-GBR resources for user devices located within the geographical space based on the quality factor.

In another example, an AMF of a server system can receive performance parameters and location information from a user device. The performance parameters can describe the quality of the wireless connection between the user device and the telecommunications network. The location information includes the location information of the user device. The server system can determine a geographical space associated with the user device based on the location information of the user device. The server system can determine a quality factor for the geographical space associated with the user device. The quality factor indicates whether a user device located within the geographical space should be allocated with GBR resources or non-GBR resources. The AMF can transmit a message including the quality factor to a core network function of the server system. The core network function can optimize the allocation of GBR and non-GBR resources for the geographical space based on the quality factor.

In yet another example, an AMF of a server system associated with a telecommunications network can receive performance parameters and location information from a user device. The performance parameters can describe quality of a wireless connection between the user device and the telecommunications network during a real-time time interval. The location information can include the location information of the user device during the real-time time interval. The AMF can determine a geographical space associated with the user device based on the location information of the user device. The AMF can determine a quality factor for the geographical space associated with the user device. The quality factor can indicate whether a user device located within the geographical space should be allocated with GBR resources or non-GBR resources. The AMF can determine whether the quality factor for the real-time time interval is different from historical quality factors for the geographical space. The historical quality factors are stored at a database in communication with the AMF. In response to a determination that the quality factor for the real-time time interval is different from the historical quality factors, the AMF can transmit a message including the quality factor to a core network function of the server system. The core network function can optimize the allocation of GBR and non-GBR resources for user devices located within the geographical space based on the quality factor.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL)

transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218. The processes The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

In some implementations, the AMF 210 is configured to communicate with a database 230. The database 230 can be part of, or separate from, the core network functions architecture 200. The database 230 can be read and written to by the AMF 210. The database 230 can be configured to store performance data correlated with location information as well as quality factors determined by the AMF, as will be described with respect to FIGS. 3-5.

Location-based Optimization of QoS Performance

Figure 3:
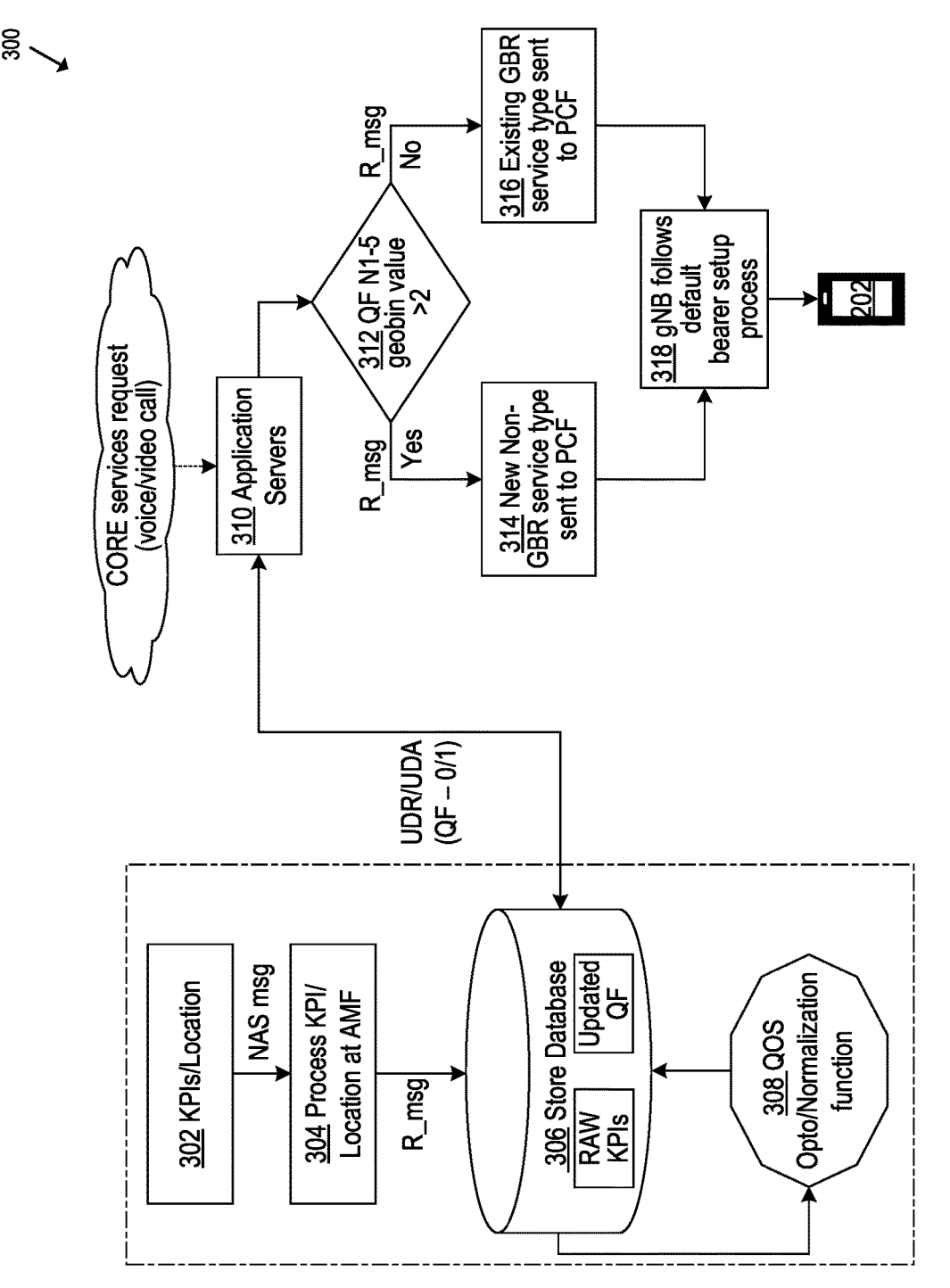
FIG. 3 is a diagram illustrating an exemplary workflow for optimizing QoS network performance.

FIG. 3 is a diagram illustrating an exemplary workflow 300 for optimizing QoS network performance. The workflow can be performed by core network functions of a wireless network provider (e.g., the architecture 200 described with respect to FIG. 2) that is in communication with user devices (e.g., the wireless device 202 in FIG. 2) and a database (e.g., the database 230 in FIG. 2). The user devices can include wireless devices, routers, or hotspot nodes. In particular, the workflow involves interactions between an AMF, a database, and application servers (e.g., the AMF 210, the database 230, and the AF 228, respectively, in FIG. 2).

At 302, user devices provide performance parameters (e.g., key performance indicators (KPIs)) and location information associated with the user devices. The performance parameters include, for example, channel quality condition (CQI) and SINR data describing wireless connection quality associated with the respective user devices. The performance parameters and the location information can be received in a format of non-access stratum (NAS) messages. At 304, the AMF can process the parameter performance parameters and the location information. The processing of the location information can include determining geobins (e.g., geographical spaces or regions) associated with the locations of the user devices. The processing further includes correlating the geobins with quality categories based on the performance parameters. At 306, the AMF can store the performance data in the database (or a data lake). The AMF can further determine a quality factor (e.g., a QoS factor) for each of the geobins, as described in detail with respect to FIG. 4. The quality factors describe the quality of real-time or near real-time wireless connections within a respective geobin. The quality factors can indicate whether the respective geobin requires the deployment of GBR resources or whether the respective geobin has sufficiently high network quality with the deployment of non-GBR resources. The database can store historical quality factors and update the historical quality factors based on the QoS normalization function at 308. In some implementations, the processing and QoS normalization can be performed by the database 230.

The AMF is in communication with the application servers (or application functions). At 310, the application servers can receive a request to establish voice or video calls (e.g., CORE services request) to a user device within a particular geobin (e.g., the wireless device 202 in FIG. 3). In response to the request, the application servers also request or retrieve the real-time quality factor associated with the particular geobin. At 312, the application servers apply a logic to determine whether the quality factor associated with the geobin has changed compared to historical quality factors for the particular geobin. In response to the determination, the application servers generate a message (e.g., R-msg) that indicates whether the PCF should deploy an existing or a new GBR service type for the wireless device 202. For example, when the quality factor for the particular geobin has changed above a pre-defined threshold, a new non-GBR service type is sent to the PCF at 314. When the quality factor for the particular geobin has not changed above the pre-defined threshold, an existing GBR service type is sent to the PCF at 316. At 318, a base station (e.g., a base station 102 such as gNB NAN) performs a default non-GBR/GBR resource (e.g., bearer) setup process in accordance with the service type to establish the voice or video call terminating at the wireless device 202.

In some implementations, certain developments can be implemented at the NF architecture (e.g., the architecture 200) to facilitate the workflow 300. For example, Uhhd/UDR (UDM, UDR, HSS) interface can support sending and receiving messages (e.g., R messages) in HSS. Rx/Gx interface can support changing media types during a voice or video call based on the received messages when it is determined that the call quality can remain good based on the received message. For example, Rx interface can be used to exchange flow based charging control information between charging rules function (CRF) and the AF. Gx interface is placed between a policy server (e.g., policy and rule charging function (PCRF) and a traffic forwarding node (e.g., a policy and charging enforcement function) that enforces rules set by the policy server. Sh (UDR/UDA) diameter interface can support conveying the messages during a call setup. P-call session control function (P-CSCF) can support selecting new media types (e.g., including additional functionalities such as overwriting). PCF can include capabilities to support additional media types (e.g., voice, video, or data). The quality factor can be utilized within the messages as a weightage factor in a decision-making process to modify the GBR/non-GBR resources. The respective NF elements can communicate with each other and to the user device to assign an appropriate resource for a new call or modify the existing resource for an active call.

FIG. 4 is a diagram illustrating an exemplary logic 400 for transforming performance parameters to quality factors. The logic step 1 illustrates a table including performance parameters CQI (e.g., having ranges A, B, and C) and SINR (e.g., having ranges X, Y, Z) received, for example, from three different user devices at different locations. The table includes a quality characterization of the wireless connection associated with the user device that provided the parameters at different levels (e.g., poor, moderate, excellent). The characterization is performed based on a combination of the CQI and SINR ranges. The logic step 2 illustrates a determination of the geobin (e.g., geobin 1, 2, and N) based on latitude and longitude coordinates associated with the location of the user device. The logic step 3 illustrates a correlation of the quality characterization with the respective geobins. The correlation is associated with a particular time interval. The time interval can include a real-time (or near real-time) time interval. The logic step 3 also includes a quality factor (e.g., QoS factor) associated with the geobins. For example, the geobins determined to have an excellent or moderate wireless network quality based on the performance parameters are assigned for non-GBR resources, while the geobin determined to have a poor wireless network quality is assigned for GBR resources.

The quality factors from the logic step 3 can further be compared to historical quality factors associated with respective geobins. The historical quality factors are collected at different time intervals (1 min, 5 min, 10 min, 30 min, etc.) during a pre-defined time period (e.g., 6 hours, 12 hours, 24 hours, or 48 hours). For example, the quality factors for geobin 1, geobin 2, through geobin N are normalized across time intervals (n+1), (n+2) through (n+3) to receive updated quality factors.

FIG. 5 is a flow diagram that illustrates processes 500 for location-based optimization of QoS network performance. The processes 500 can be performed by a server system (e.g. the core network functions architecture 200 in FIG. 2) associated with a wireless network (e.g., the wireless network 100 in FIG. 1). The system includes an AMF (e.g., the AMF 210 in FIG. 2) in communication with a database (e.g., the database 230 in FIG. 2) and multiple user devices (e.g., the wireless device 202 in FIG. 2). The server system can be associated with a telecommunications network and include at least one hardware processor and at least one non-transitory memory storing instructions (e.g., a computer system 600 described with respect to FIG. 6). When the instructions are executed by the at least one hardware processor, the server system performs the processes 500. The processes 500 are directed for optimizing deployment of GBR resources (e.g., 5Q1-1 bearers) and non-GBR resources (e.g., 5Q1-6 bearers) based on the locations of user devices, for example, when establishing wireless connections for voice or video calls on the user devices. For example, for establishing a voice call with a GBR, one or more 5Q1-1 bearers will be established since the gNB will pre-allocate 40 Physical Resource Blocks (PRBs) for a voice call. In contrast, when non-GBR 5QI-6 bearer is setup, no PRBs are pre-allocated for establishing a service.

At 502, the AMF can receive performance parameters and location information from a user device. The performance parameters can describe the quality of a wireless connection between the user device and the telecommunications network during a real-time (or nearly real-time) time interval. In some implementations, the performance parameters describing the quality of the wireless connection between the user device and the telecommunications network include CQI and SINR during the real-time time interval. CQI is a parameter of telecommunications systems that describes a state of a communication channel. CQI can be a value (e.g., a value between 0 and 15) that indicates a level of modulation and coding a user device could operate. SINR is a measure of the strength of the desired signal relative to background noise. CQI and SINR together are parameters describing the wireless network performance of a user device.

The location information can include location information for the user device during the real-time time interval. The user device can be a wireless device, a router, or a hotspot node. The location information can include latitude and longitude coordinates associated with the location information of the user device. The location information can be determined based on, for example, the global positioning system (GPS).

The AMF can receive the performance parameters and the location information via an NAS information element (NAS IE), which establishes periodic and asynchronous data transfer from the user devices to the AMF via N1/N2 interfaces (e.g., N1/N2 interfaces shown in FIG. 2). The NAS IE can be facilitated by the RAN.

In some implementations, the AMF further sends to the user device instructions to periodically transfer performance parameters and location information of the user device to the AMF. The performance parameters describing the quality of the wireless connection between the user device and the telecommunications network and the location information of the user device during the real-time time interval can be received from the user device in response to the instructions sent by the AMF. For example, a user device accesses the wireless network (e.g., the RAN and respective NFs), completes an initial attachment procedure, and completes an initial NAS messaging with the AMF together with an authentication process and resources setup process. As part of the setup process, the AMF sends the instructions to the user device to provide the performance parameters and location information periodically to the AMF.

The AMF can read and write the performance parameters and the location information to the database (e.g., data in logic steps 1 and 2 in FIG. 4).

At 504, the AMF can determine a geographical space associated with the user device based on the location information of the user device. In some implementations, the geographical space corresponds to a space having a particular diameter around a location identified in the location information of the user device. For example, the geographical space can be a sphere having a diameter (e.g., 5 meters, 10 meters, or 15 meters) defined around the location of the user device.

At 506, the AMF can determine a quality factor for the geographical space associated with the user device (e.g., as described with respect to FIG. 4). The quality factor indicates whether a user device located within the geographical space should be allocated with GBR resources or non-GBR resources. In some implementations, determining the quality factor includes an assignment to a quality category of multiple quality categories (e.g., categories poor, moderate, and excellent in FIG. 4) and wherein the assignment is determined based on the performance parameters (e.g., the logic step 1 in FIG. 4).

At 508, the AMF can temporarily store the quality factor correlated with the geographical space to the database (e.g., the table of logic step 3 stored in the database). The AMF can further update the historical quality factors with the quality factor correlated with the geographical space associated with the real-time time interval (e.g., as described with respect to the normalization function in FIG. 4).

In some implementations, the database includes historical performance parameters associated with multiple geographical spaces collected during multiple time intervals within a pre-defined time period (e.g., the table for normalization function in FIG. 4). The system can be caused to determine historical quality factors based on the historical performance parameters associated with the multiple time intervals across the pre-defined time period. For example, the historical performance parameters at time intervals (n+1), (n+2), and (n+3) can be collected over a pre-defined time period (e.g., 6 hours, 12 hours, 24 hours, or 48 hours). The system can be further caused to normalize the historical quality factors associated with the multiple time intervals across the pre-defined time period (e.g., the updated quality factor (QF) in FIG. 4). In some implementations, the historical quality factors are determined based on historical performance parameters collected from one or more user devices located within the geographical space during a pre-defined time period.

At 510, the AMF can determine whether the quality factor for the real-time time interval is different from historical quality factors for the geographical space. In some implementations, the wireless device that provides the performance parameters and the location information to the AMF at 502 is a first user device. An application server of the server system (e.g., act 310 by the AF 228 in FIG. 3) can receive a request to terminate a voice call or a video call to a second user device located within the geographical space. The second user device can be different or the same as the first user device. Determining whether the quality factor for the real-time time interval is different from historical quality factors for the geographical space can be performed in response to receiving the request to terminate the voice call or a video call.

At 512, in response to a determination that the quality factor for the real-time time interval is different from the historical quality factors, the AMF can transmit a message including the quality factor to an NF of the server system (e.g., acts 312, 314, and 316 in FIG. 3). In some implementations, the AMF transmits the message including the quality factor to the PCF of the core network functions. The PCF is caused to provide instructions to one or more network access nodes for allocation of the GBR and non-GBR resources for user devices located within the geographical space based on the quality factor.

At 514, the core network function can optimize, by the NF, the allocation of GBR and non-GBR resources for user devices located within the geographical space based on the quality factor. The optimization can include dynamic and selective deployment of the GBR and non-GBR resources at a particular geographical space using the real-time or near real-time determination of quality factors. For example, in an instance that the quality factor indicates that a particular geographical space does not require the deployment of GBR resources, the NF (e.g., the PCF 212 in FIG. 2) can instead allow a requested voice or video call to be established via non-GBR resources.

In some implementations, the processes 500 can be applied for removing guaranteed over-the-air resource block (RB) requirements for services based on the wireless connection performance at the user devices. As an example, approximately 30% of voice and video call termination attempts may be unanswered (e.g., redirected to a voicemail). However, every mobile termination attempt requires GBR requirements until that call is redirected to voicemail. In an instance where resource congestion approaches, traffic using non-GBR resources must be redirected (e.g., user devices are pushed to potentially sub-optimal non-GBR cells). To prevent this, providers can overbuild the network in order to minimize user device call redirections. However, over-the-top voice and video call applications have proven that audio and video communication services provide acceptable quality to customers when using non-GBRs when the user device is in a location associated with good to excellent radio frequency (RF) conditions. A measure of the current and historical view of the user device performance (e.g., the quality factors described with respect to FIGS. 3-5) allows the wireless network to make real-time determinations to allocate GBR versus non-GBR resources, thereby allowing the network service provider to make more efficient uses of the RF space.

In some implementations, the processes 500 can be applied to generate and store detailed location-based performance parameters of the wireless network quality (e.g., the data stored at the database 230 described with respect to FIGS. 3-5). Such detailed performance parameters can be used by market teams of network service providers, for example, to line up market performance with NF expectations. With geobin assignment and user device/RAN performance parameters being accounted for, network service providers can extend to include the performance parameters correlated with geobins to generate end-to-end performance parameters.

Computer System

Figure 6:
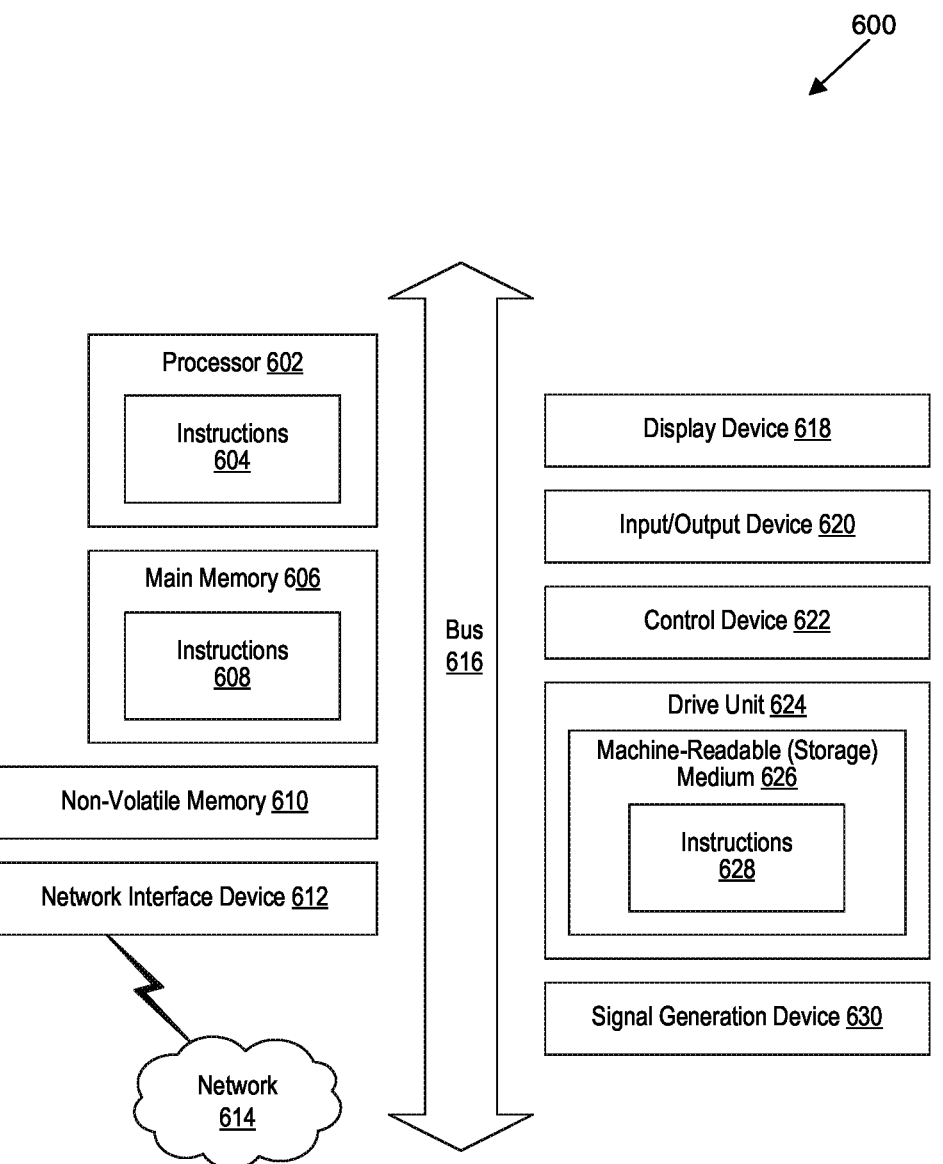
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A server system associated with a telecommunications network, the server system being configured to communicate with a database and a user device, the server system comprising:

at least one hardware processor; and at least one non-transitory memory storing instructions, which, when executed by the at least one hardware processor, cause the server system to:

receive, from the user device by an access and mobility management function (AMF) of the server system:

performance parameters describing quality of a wireless connection between the user device and the telecommunications network during a real-time time interval, and location information of the user device during the real-time time interval;

determine a geographical space associated with the user device based on the location information of the user device;

determine a quality factor for the geographical space associated with the user device, wherein the quality factor indicates whether a user device located within the geographical space should be allocated with guaranteed bit rate (GBR) resources or non-guaranteed bit rate (non-GBR) resources;

determine whether the quality factor for the real-time time interval is different from historical quality factors for the geographical space, wherein the historical quality factors are stored at the database;

in response to a determination that the quality factor for the real-time time interval is different from the historical quality factors, transmit, by the AMF, a message including the quality factor to a core network function of the server system; and optimize, by the core network function, the allocation of GBR and non-GBR resources for user devices located within the geographical space based on the quality factor.

2. The system of claim 1, further caused to:

temporarily store, by the AMF, the quality factor correlated with the geographical space to the database; and update historical quality factors with the quality factor correlated with the geographical space associated with the real-time time interval.

3. The system of claim 1:

wherein the database comprises historical performance parameters associated with multiple geographical spaces collected during multiple time intervals within a pre-defined time period;

wherein the system is caused to determine historical quality factors based on the historical performance parameters associated with the multiple time intervals across the pre-defined time period; and wherein the system is further caused to normalize the historical quality factors associated with the multiple time intervals across the pre-defined time period.

4. The system of claim 1:

wherein the historical quality factors are determined based on historical performance parameters collected from one or more user devices located within the geographical space during a pre-defined time period.

5. The system of claim 1, further caused to:

send, by the AMF to the user device, instructions to periodically transfer performance parameters and location information of the user device to the AMF, wherein the performance parameters describing the quality of wireless connection between the user device and the telecommunications network and the location information of the user device during the real-time time interval are received from the user device in response to the instructions sent by the AMF.

6. The system of claim 1:

wherein the performance parameters describing the quality of wireless connection between the user device and the telecommunications network comprise channel quality condition (CQI) and signal-to-noise ratio (SINR) during the real-time time interval.

7. The system of claim 1:

wherein the location information of the user device comprises latitude and longitude coordinates associated with the location information of the user device.

8. The system of claim 1:

wherein the geographical space corresponds to a space having a particular diameter around the location information of the user device.

9. The system of claim 1:

wherein determining the quality factor includes an assignment to a quality category of multiple quality categories; and wherein the assignment is determined based on the performance parameters.

10. The system of claim 1:

wherein the user device is a wireless device, a router, or a hotspot node.

11. The system of claim 1:

wherein the user device is a first user device; and wherein the system is further caused to:

receive, by an application server of the server system, a request to terminate a voice call or a video call to a second user device located within the geographical space, wherein determining whether the quality factor for the real-time time interval is different from historical quality factors for the geographical space is performed in response to receiving the request to terminate the voice call or the video call.

12. The system of claim 1:

wherein the AMF transmits the message including the quality factor to a policy control function (PCF) of the core network functions; and wherein the PCF is caused to provide instructions to one or more network access nodes for allocation of the GBR and non-GBR resources for user devices located within the geographical space.

13. A method performed by an access and mobility management function (AMF) of a server system associated with a telecommunications network, the method comprising:

receiving, from a user device by the AMF:

performance parameters describing quality of a wireless connection between the user device and the telecommunications network during a real-time time interval, and location information of the user device during the real-time time interval;

determining, by the AMF, a geographical space associated with the user device based on the location information of the user device;

determining, by the AMF, a quality factor for the geographical space associated with the user device, wherein the quality factor indicates whether a user device located within the geographical space should be allocated with guaranteed bit rate (GBR) resources or non-guaranteed bit rate (non-GBR) resources;

determining, by the AMF, whether the quality factor for the real-time time interval is different from historical quality factors for the geographical space, wherein the historical quality factors are stored at a database in communication with the AMF;

in response to a determination that the quality factor for the real-time time interval is different from the historical quality factors, transmitting, by the AMF, a message including the quality factor to a core network function of the server system; and optimizing, by the core network function, the allocation of GBR and non-GBR resources for user devices located within the geographical space based on the quality factor.

14. The method of claim 13, further comprising:

temporarily storing, by the AMF, the performance parameters received from the user device correlated with the geographical space to the database; and updating previously stored historical performance parameters with the performance parameters and the location information of the user device associated with the real-time time interval.

15. The method of claim 13:

wherein the database comprises historical performance parameters associated with multiple geographical spaces collected during multiple time intervals within a pre-defined time period; and wherein the system is further caused to determine the historical performance parameters by normalizing the historical performance parameters associated with the multiple time intervals across the pre-defined time period.

16. The method of claim 13:

wherein the historical quality factors are determined based on historical performance parameters collected from one or more user devices located within the geographical space during a pre-defined time period.

17. The method of claim 13, further comprising:

sending, by the AMF to the user device, instructions to periodically transfer performance parameters and location information of the user device to the AMF, wherein the performance parameters describing the quality of wireless connection between the user device and the telecommunications network and the location information of the user device during the real-time time interval are received from the user device in response to the instructions sent by the AMF.

* * * * *